United States Patent
Hall et al.

(10) Patent No.: US 11,565,166 B2
(45) Date of Patent: Jan. 31, 2023

(54) GOLF GAME IMPLEMENTATION USING BALL TRACKING AND SCORING SYSTEM

(71) Applicants: Patricia Hall, Long Beach, CA (US); Matthew Hall, Long Beach, CA (US); Jonathan Hall, Long Beach, CA (US); Joseph Hall, Long Beach, CA (US)

(72) Inventors: Patricia Hall, Long Beach, CA (US); Matthew Hall, Long Beach, CA (US); Jonathan Hall, Long Beach, CA (US); Joseph Hall, Long Beach, CA (US)

(*) Notice: Subject to any disclaimer, the term of this patent is extended or adjusted under 35 U.S.C. 154(b) by 0 days.

(21) Appl. No.: 17/834,980

(22) Filed: Jun. 8, 2022

(65) Prior Publication Data
US 2022/0387873 A1    Dec. 8, 2022

Related U.S. Application Data

(60) Provisional application No. 63/208,029, filed on Jun. 8, 2021.

(51) Int. Cl.
| | |
|---|---|
| *A63B 71/06* | (2006.01) |
| *G06T 7/20* | (2017.01) |
| *G06T 11/00* | (2006.01) |
| *A63B 24/00* | (2006.01) |
| *A63B 69/36* | (2006.01) |

(52) U.S. Cl.
CPC ...... *A63B 71/0622* (2013.01); *A63B 24/0021* (2013.01); *G06T 7/20* (2013.01); *G06T 11/00* (2013.01); *A63B 69/3694* (2013.01); *A63B 2024/0028* (2013.01); *A63B 2071/0691* (2013.01); *A63B 2220/05* (2013.01); *A63B 2220/806* (2013.01); *G06T 2200/24* (2013.01); *G06T 2207/10016* (2013.01); *G06T 2207/20081* (2013.01); *G06T 2207/30224* (2013.01); *G06T 2210/21* (2013.01)

(58) Field of Classification Search
CPC ............ A63B 71/0622; A63B 24/0021; A63B 69/3694; A63B 2024/0028; A63B 2071/0691; A63B 2220/05; A63B 2220/806; G06T 7/20; G06T 11/00; G06T 2200/24; G06T 2207/10016; G06T 2207/20081; G06T 2207/30224; G06T 2210/21
See application file for complete search history.

(56) References Cited

U.S. PATENT DOCUMENTS

| | | | | |
|---|---|---|---|---|
| 4,915,384 | A * | 4/1990 | Bear | A63B 69/3614 |
| | | | | 473/154 |
| 6,377,296 | B1 * | 4/2002 | Zlatsin | G06T 7/20 |
| | | | | 707/E17.026 |
| 9,563,955 | B1 * | 2/2017 | Kamarshi | G06T 7/246 |
| 10,467,478 | B2 * | 11/2019 | Chen | G06T 7/70 |
| 10,600,334 | B1 * | 3/2020 | Zhang | A63B 71/0669 |
| 10,657,728 | B2 * | 5/2020 | Kamal | G06T 19/006 |
| 2021/0322850 | A1 * | 10/2021 | Hermandorfer | A63F 13/53 |

* cited by examiner

*Primary Examiner* — Manav Seth
(74) *Attorney, Agent, or Firm* — Adam Warwick Bell

(57) ABSTRACT

A ball tracking and scoring system and also enables a game implementation system using this system.

16 Claims, 6 Drawing Sheets

The live topography image with the scoring map superimposed, producing a hybrid live-virtual environment.

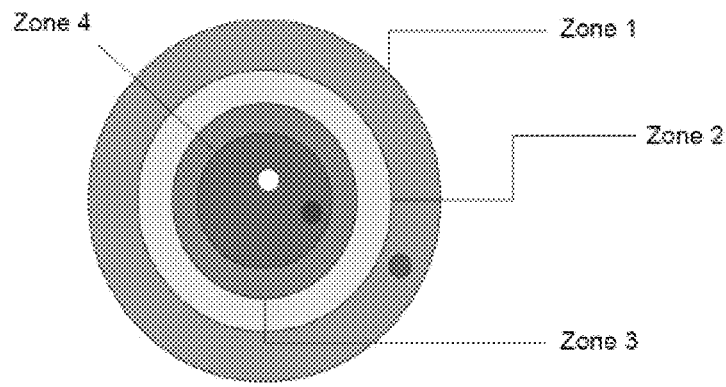
FIG. 3: The playfield is divided into different zones. Closer the zone to the center higher the score.
Single Stage Ball Detection
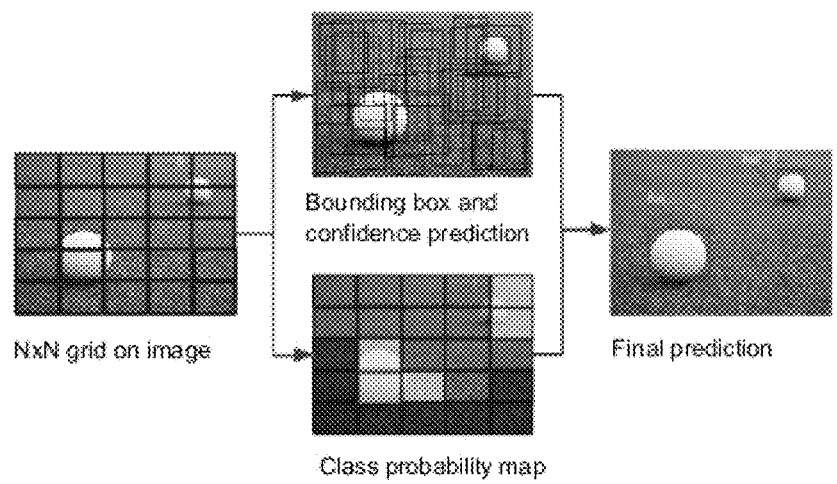
FIG. 4

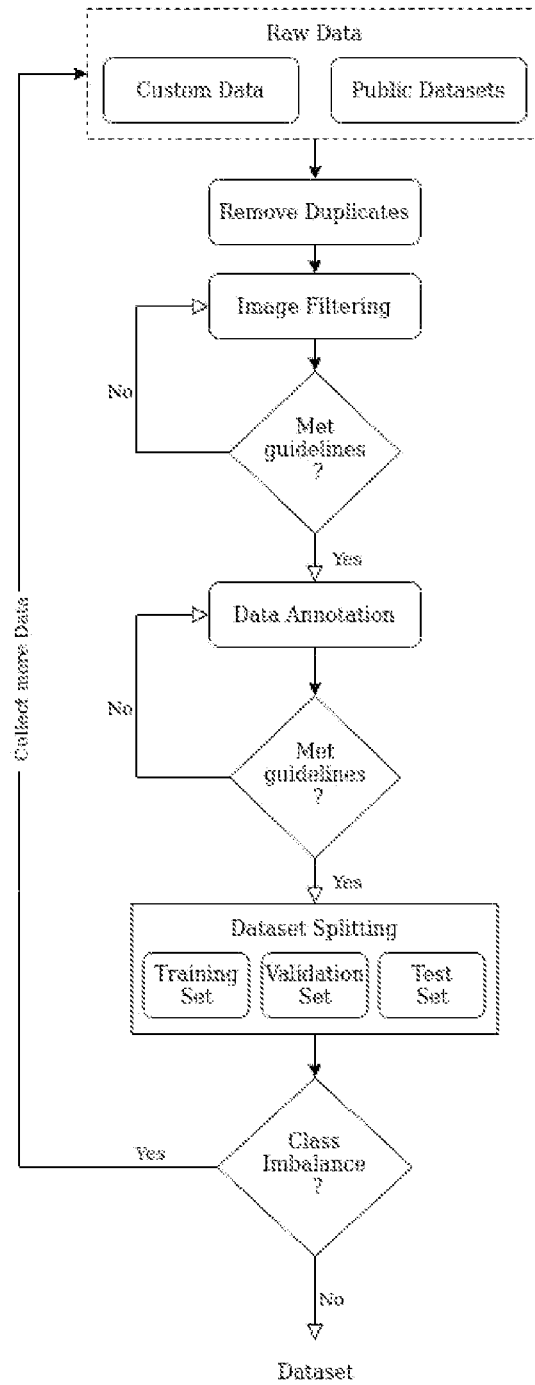
FIG. 5 : Dataset Curation

IoU = 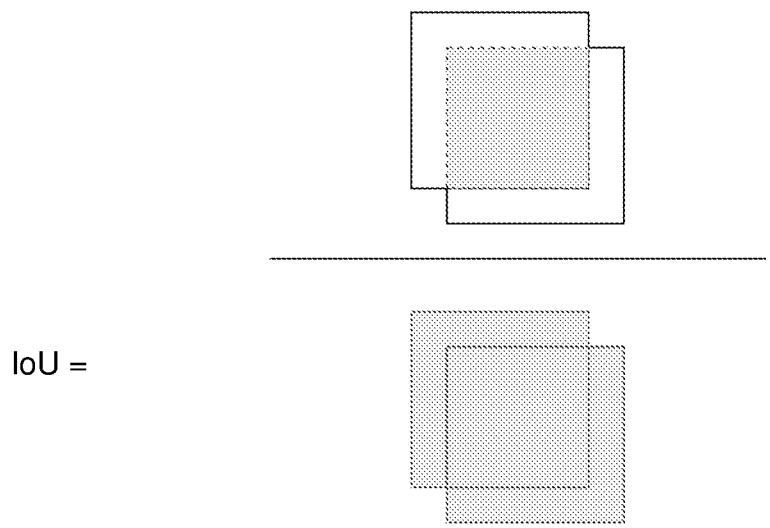
FIG. 6: IoU score calculation, it's the ratio of area overlap to the area of union.
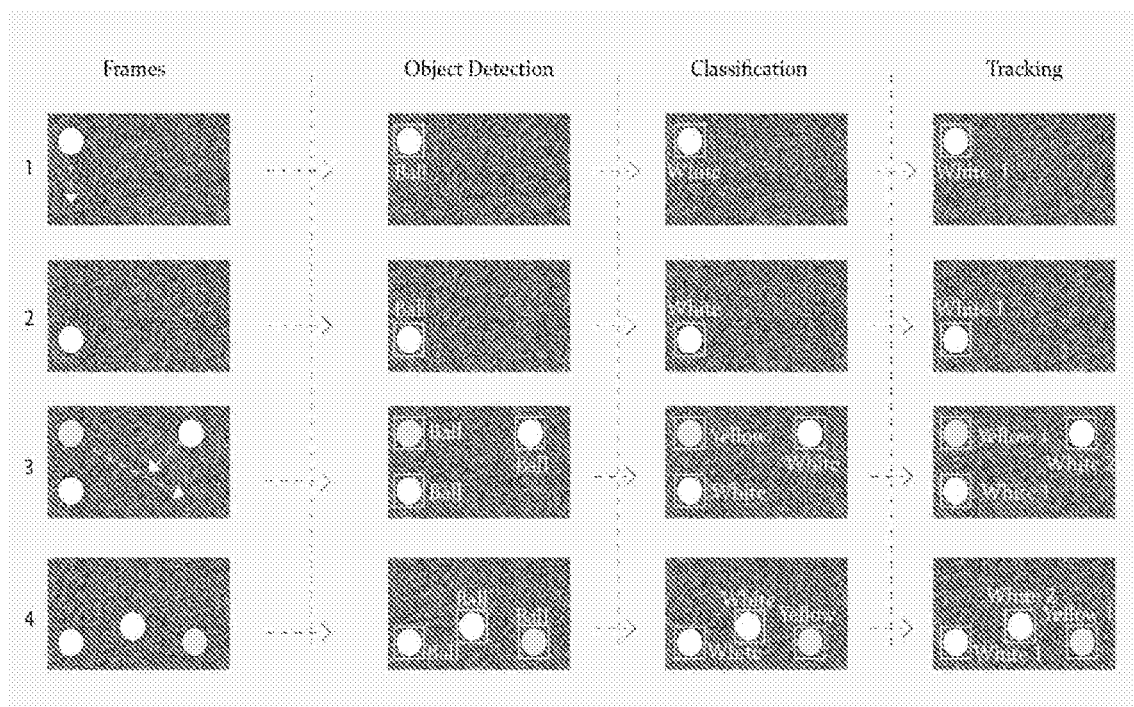
FIG. 7: Steps involved in ML pipeline.

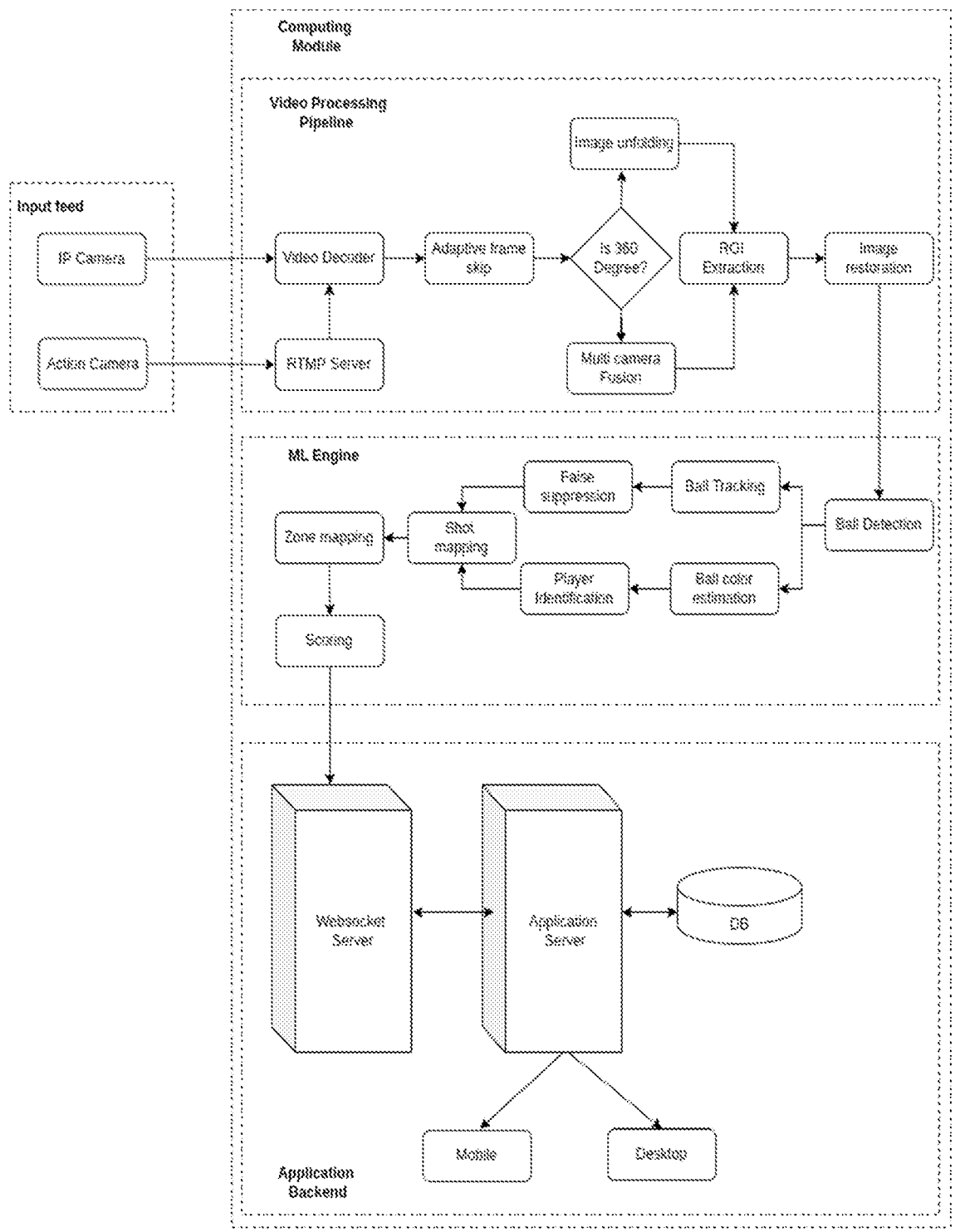
FIG. 8: Flow diagram of the golf gamification system.

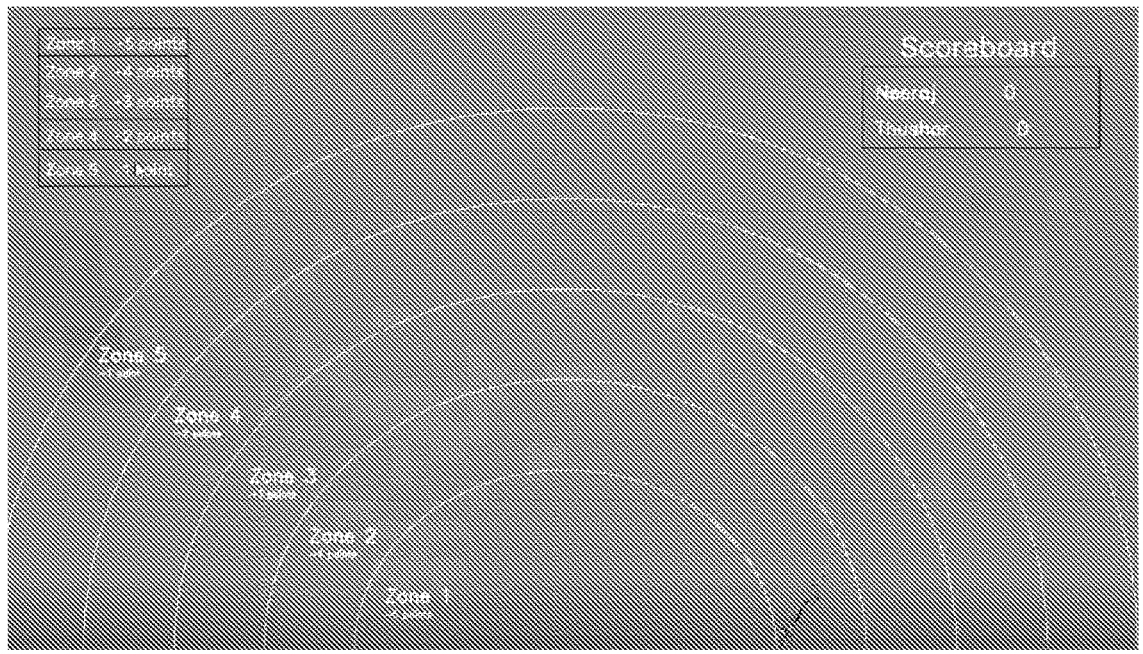
FIG. 9: The scoring-map (grid) to be superimposed on the live topography.
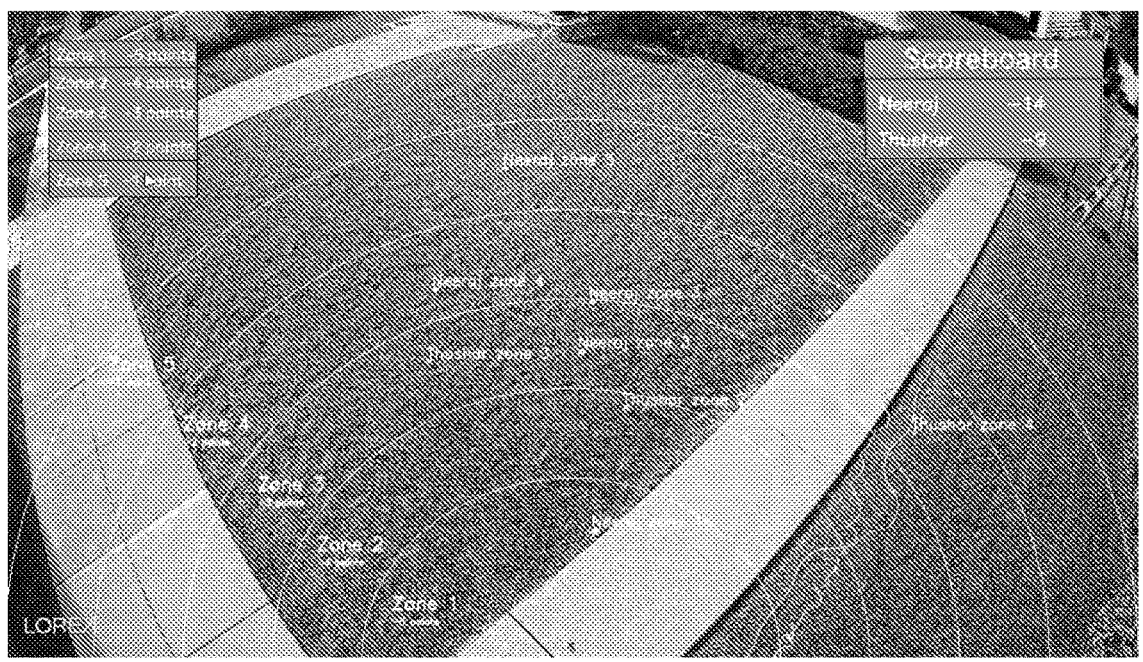
FIG. 10: The live topography image with the scoring map superimposed, producing a hybrid live-virtual environment.

GOLF GAME IMPLEMENTATION USING BALL TRACKING AND SCORING SYSTEM

RELATIONSHIP TO OTHER APPLICATIONS

This application claims the benefit of and priority to 63/208,029 filed 8 Jun. 2021, incorporated by reference herein.

BACKGROUND

Golf is hugely popular. Scoring relates to the number of shots taken to sink the ball into a series of holes, creating a value over or under a set par value. Scoring is usually done with paper and pencil. Scoring in golf and many other ball games such as bocce ball, boulle, boles etc., is related to the proximity of a ball's resting place to a set target. It would be enjoyable and commercially attractive to be able to track and score a ball's movement and location electronically and store this information in a database, and display this information graphically on the screen of a computer, hand-held device or phone. Additionally, it would be enjoyable and commercially attractive to be able to create a virtual map on which to play a game with real balls, and to play such a game with other players in real time, but who may be physically remote.

Various methods have been used to assist golf players in locating their golf ball. In some instances, for example, the golf ball may contain a small transmitter or transceiver (radio frequency, RFDI, Bluetooth etc.) that may be used to transmit a signal that may be used by an appropriate receiver to detect the golf ball. In such instances, the golf player may use such a receiver to locate the golf ball within or along the golf course playing surface. In some instances, the signals associated with different golf balls may be differentiated, such as by using different frequencies, to differentiate between different golf balls.

Other systems use radar-based system that tracks the trajectory of the balls starting from its launch position, all the way to where the ball lands. Radar inputs are time stamped and strung together to give the user a constructed trajectory of where the ball lands in relation to a target area. The radar system can be used to identify trajectory and final resting place of the ball.

Another system uses GPS and Bluetooth technology within the balls themselves to identify the movement and resting location of the ball. Final resting position can be predicted during ball movement.

Another system used by TopGolf® uses a microchip within the balls coupled with triangulating towers to track and locate the balls. TopGolf chose an Impinj RAIN RFID solution.

A golf-ball tracking system is disclosed in US application 0200330830, which describes a smart golf ball comprising an inner microcontroller with memory and at least one processor; a power supply in communication with the microcontroller; and an RF transmitter/receiver in communication with the microcontroller; an outer core surrounding the inner electronics core; and a skin layer covering the outer core. Also provided is a data processing system configured for golf ball tracking, comprising: a host computing system; a display in communication with the host computing system; one or more smart golf balls, each comprising a Real Time Location System (RTLS) Ultra-wideband (UWB) transmitter/receiver and a corresponding ID, in communication with the host computing system; three or more beacons, each comprising an RF transmitter/receiver, in communication with the host computing system; and a golf ball tracking module.

Another system that tracks golf shots is described in US application 20190022460. This describes a golf tracking system including a tag coupled to a golf club. The tag includes a plurality of sensors, each which output a signal based on a detected movement of the golf club, a microcontroller that compares each of the plurality of sensor outputs to stored reference sensor output values, and a transceiver that transmits data corresponding to the sensor outputs to a device remote from the tag based on the comparison performed by the microcontroller. The location-aware device then processes the information received from the tag to determine whether a shot should be registered.

One prior art embodiment (US application 20190311543) describes a system using VR goggles for use with a mixed reality golf simulation and training system that can use existing standard golf equipment, a golf ball launch monitor to track the initial ball positional data, spin and acceleration, and simulate the complete ball path and location or use complete ball tracking data and displays the actual ball path and location. Mixed reality glasses allow the display of ball tracking data over the real world view and/or an immersive display of a simulated world view, depending on the user's head or view position. Golf simulation graphical views can include various options, including simulated or panoramic photographic views of a golf course, simulated graphics and data superimposed over a real world driving range view, or simple ball tracking data superimposed over a real world view at any location.

Another interesting prior art embodiment (US application 20200269121) discloses a system comprising one or more sensors arrayed adjacent to a golf course playing surface to track the trajectory and determine a resting location of a golf ball it travels along the golf course playing surface. The sensors may include motion detecting sensors that may determine various measurements related to the location and/or movement of the golf ball, such as an initial impact location, a velocity, and/or a direction of travel of the golf ball along the golf course playing surface. The signals from the motion detecting sensors may further be used to determine a resting location for the golf ball and/or a rate of acceleration/deceleration of the golf ball. The various signals may be averaged together to determine a velocity and/or direction of travel of the golf ball.

A further invention (US application 20200139193) discloses a system for visually tracking the trajectory of an in-flight golf ball through an x-y-z space above a driving range includes a plurality of cameras for respectively creating a video stream of the x-y-z space. Each video stream is presented on a dedicated camera focal plane with information on respective azimuth angles .theta. and elevation angles .PHI. from the particular camera to the in-flight golf ball. A central computer is connected with the camera focal plane of each camera to identify a start point for the golf ball, to track its trajectory in the x-y-z space, and to filter out background clutter. A visual display is provided to show the in-flight golf ball from its start point to a target point in real time.

US 2004/0212630 discloses a method for displaying otherwise unseen objects and other data using augmented reality. The method uses a motorized camera mount that can report the position of a camera on that mount back to a computer. With knowledge of where the camera is looking, and the size of its field of view, the computer can precisely overlay computer-generated imagery onto the video image produced by the camera.

US 2011/0305369 discloses a portable wireless mobile device motion capture and analysis system configured to display motion capture/analysis data on a mobile device. The system obtains data from motion capture elements and analyzes the data.

KR 2011 0122952 discloses a Head Mounted Display for golf simulation comprising display units, one or more cameras, and an inclination sensor. The display unit is installed inside the main body and displays an image. The inclination sensor detects the sight of a golf player. One or more cameras are installed outside the main body and include an image including a real golf ball. The HMD for golf simulation displays an image filmed by cameras in a display unit.

US 2005/0225867 discloses goggles including a goggle main body on which information processing means is mounted. The goggle main body has an eye piece portion on which information display means is mounted. Information transmission means of transmission/reception of information on sports to/from outside can be mounted on the goggle main body. Furthermore, the information processing means and the information display means may be made as a unitary block.

US20190134506A1 Discloses a sport and game simulation system. One example includes: determining that a first ball of a plurality of balls enters an inner zone of a target and in response to determining that the first ball enters the inner zone, assigning a first point value to a game participant associated the first ball. The method also includes determining that a second ball, different from the first ball, of the plurality of balls enters at least one outer zone of the target, and in response to determining that the second ball enters the at least one outer zone, assigning a second point value to a game participant, the second point value being less than the first point value. The method also includes providing instructions to display the first point value and second point value.

Current solutions inherently have various shortcomings. Firstly they are generally very expensive and technologically complex, requiring considerable capital investment and installation costs. Systems with technology within the balls makes the balls too expensive per unit, and not an attractive alternative to buying regular balls. GPS or radar towers systems require very expensive installation and set-up. These current solutions are too expensive for backyard non-commercial use. Manual scoring is an excellent option, but of course it can be impossible to see where the balls land, it is a slow process and slows down game flow, it is difficult to distinguish what balls are being scored, and of course you cannot play an electronically linked game with your friends, be they at the same location or far away.

BRIEF DESCRIPTION OF THE FIGURES

FIG. 3 Schematic of zone scoring.

FIG. 4 Single stage ball detection.

FIG. 5 Dataset Curation.

FIG. 6: IoU (Intersection Over Union); Ratio of area overlap to the area of union (score).

FIG. 7 Steps involved in ML pipeline.

FIG. 8 Flow diagram of the golf gamification system.

FIG. 9 The scoring-map (grid) to be superimposed on the live topography.

FIG. 10 The live topography image with the scoring map superimposed, producing a hybrid live-virtual environment.

BRIEF DESCRIPTION OF THE INVENTION

Figure 1:
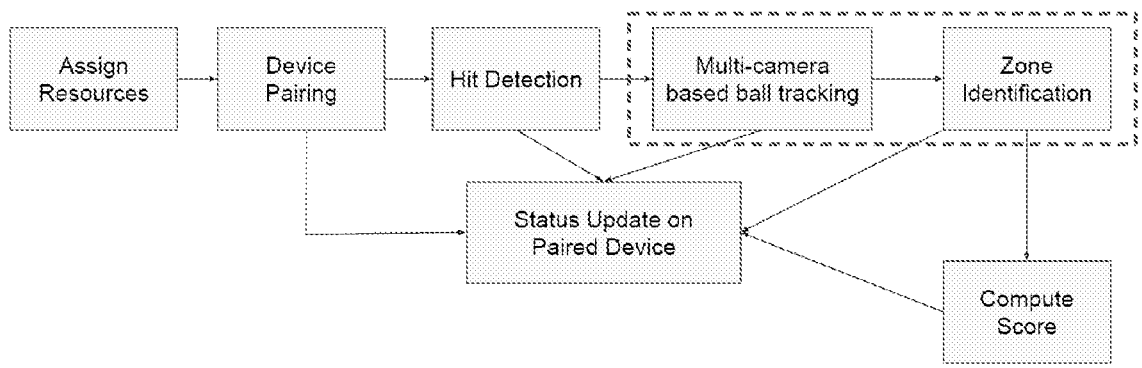
FIG. 1 Product service flow diagram

The invention encompasses a ball tracking and scoring system and also enables a game implementation system using this system. Briefly, the invention encompasses a system for tracking objects (e.g., balls) and specifically for locating and identifying stationary objects based on the color of the objects, within a virtual or actual landscape projected onto a two-dimensional surface, such as the ground. The projected landscape includes various zones with different scores associated with them. The final location of the golf ball in the virtual landscape determines the score associated with that ball/shot. Data is collected and the score of each ball is stored, compiled and displayed in a table or graphic on a computer, hand-held device or phone. The system can be networked so that players may play alone or compete together on the same virtual landscape (e.g. the same golf course), with the players being in the same location or in entirely separate locations. The invention includes and employs a novel golf gamification system and algorithm that includes artificial intelligence model training and machine learning and dataset curation.

DETAILED DESCRIPTION OF THE INVENTION

The present invention is generally applied to the game of golf, but is not restricted to golf, but most of the examples provided involve golf as it is envisaged as one of the primary embodiments of the invention.

Aim of the invention. The inventors wants to make practicing golf more fun and affordable for the "everyday day golfer". The aim is to develop a variety of web-based games that can be played by one person or with others hitting live balls at the Driving Range, using regular golf clubs and colored balls. The games will promote self-competition, competition with other friends that are physically with you at the driving range, competition with friends at remote driving ranges at other locations and ultimately competition other unknown at people around the world who are at their local driving ranges. Additionally, we are creating a website and App that will create a "community" that lends itself to various revenue models including subscriptions base, advertising revenue, revenue share with strategic partners, tournament revenue, fundraising opportunities of charities, potentially on-line betting or gambling revenue models. The goal is to create an Application (App) for a smart phone or other handheld device or mobile table ("Smart Phone") that allows a player or multiplayers to play a golf game on a driving range where the player is hitting real balls with real golf clubs in a real-life game setting. The player will be directed by the App to hit certain targets on the driving range and score points based on the actual location where the ball lands. This location is measured by a camera device resting in the middle of the target area on top of a flagpole like the poles that exist on the actual golf courses. Once measured the location data is communicated by the software in the ("Camera Device") back to the smart phone. The technology will allow many players on a driving range to play simultaneously. The system will allow all players at the range to play from all the various hitting bays. Moreover, the system will allow a player or players at one driving range to compete and compare with known and unknown players remotely around the United States and internationally as the remote driving range will have similarly configured targets and flagpole camera devices.

The invention allows digital scoring of golf shots from a distance by creating a system for tracking and locating a golf ball by virtue of the ball's color (i.e. any reflected wavelength, not necessarily in the visible spectrum). The system uses a computer and a camera to project and overlay a virtual map onto a two-dimensional space (a topography), with zones defined within the virtual map. The system uses optical devices (cameras) and a computer (an electronic device including integrated circuits and a CPU) running software to receive and track and identify a ball by color. When a ball is stationary and located within a specific zone, it is allocated a score associated with that zone, and optionally, a specific time. The camera sends information to a computer that runs software and that works with a transmitter/receiver system to send the score and location information to one or more second computers in one or more remote devices running an application that can store, analyze and display the score and location information.

The balls do not include any form of transmission device, such as an RF transmitter. The balls do not include any power source such as a battery or motion-activated dynamo. The balls do not actively send signals to a receiver.

The score of each ball is stored, compiled and displayed via a computer display of any sort, in a table or graphic. The system can be used alone, by one player, or networked so that players may play and compete together on the same landscape (e.g., the same golf course), even though the players are not in the same location. A novel golf gamification system and algorithm is used that employs artificial intelligence model training and machine learning.

The remote computers may include hand-held devices such as phones and laptops, and may also include a stand-alone kiosk with an interface that can be accessed by multiple players.

Colored balls are specifically assigned to a player. This information is entered into a computer. Balls are hit from a distance towards the established zones within the camera's field of view. Once the ball finally rests in a zone, the camera software registers the ball's location and assigns a corresponding score to the specific player. The color may be any reflected wavelength, not limited to the visible spectrum.

Potential scoring methods are many, and are not a limiting part of the invention. But for example, may include the following. (1) Bulls eye targeting & semi-circle distance from flag targeting: The furthest outer zone registers the highest score; the most inner zone represents the lowest and most desirable score. (2) Camera generated trap zones: The pin zone gets the lowest score (e.g., 1), and anything within the widest established range that is not in a trap receives a (e.g., 2), and "sand trap" zones receive a 3 and the "water trap" zone gets 4. The information of the score is then processed and sent to the corresponding application scoreboard which can be viewed from phone or computer. The virtual environment can also be displayed showing the topography, the ball location, the target zones and optionally the players.

The invention is enabled by use of a system comprising a camera, a shared digital kiosk, and a hand-held device such as a phone.

The camera is functionally linked to a microprocessor, and a memory programmed with a code executing commands through a CPU. The memory may be a flash memory or static RAM chip, or could be a magnetic or optical memory. The system components generally may include and be in communication with "internet of things" (IoT) components and a may include a machine learning (ML) engine for constant performance improvement and system enhancement.

The system and software utilizes a logic flow that can be, for example, similar to the logic flow shown in FIGS. 1, 5 and 8. The product service flow (FIG. 1) includes the steps as follows:
(a) assign resources
(b) device paring
(c) hit detection
(d) camera (single or multiple) ball tracking
(e) status update on paired device
(f) zone identification
(g) compute score.

The status on a paired device is continually updated at each stage when a status changes.

The camera tracking and zone identification are both performed within the camera hardware. Device paring, hit detection, ball tracking, zone identification and score all feed into the paired device which constantly updates and displays the score and/or location for each ball for each color/player.

Hardware Elements

Visual acquisition. Cameras are used for capturing golf game visuals. Generally, the system does not use any other IoT related sensors in the field to collect data. Game play visuals are streamed live from the camera to the computing module for further processing and gamification. Camera selection primarily depends on field view of the lens. Most IP Cameras support a field of view around 120°. Our system is developed so as to support different types of cameras. Field of view may be at least 120°, 180°, 2700 or 360°. The selection of them primarily depends on their use in any given application.

IP Cameras. IP cameras are used within the system of the invention. An Internet Protocol (IP) Camera ("IPcam") is a type of digital video camera which sends image data via an IP Network. The invention uses an IP Camera with a minimum resolution of 4K (3840×2160) and a minimum field of view of 120°. Field of view may be at least 120°, 180°, 2700 or 360°. We can use the PoE (Power over Ethernet) supported LAN port in the IPcam to power the camera and also to send image data through the network. Most cameras also support wireless connections to send data using the commonly used Wi-Fi technology. A 5 Ghz supported Wi-Fi system is generally used with the camera because of the high data transfer that it achieves.

Action Camera. An action camera is a digital camera that is used to record dynamic action scenes. They typically have a wide field of view, often exceeding 180 degrees, and some even support a full 360-degree view. This would potentially eliminate the need for multiple cameras to get coverage of the whole playing field. Because of its small size, this camera is more suited for a portable solution. Some current action cameras can stream to major services like Facebook, YouTube, and others. They do this by using Real-Time Messaging Protocol (RTMP) streaming, which the invention employs. There is a one-time process for setting up the streaming server URL, which contains a unique key that identifies the camera.

Computing. Computing methods used in the invention encompass various analysis and processing elements including extraction of required information from raw video feed. It includes image retrieval, filtering, feature extraction, object localization, object tracking, color classification and virtual gamification. These processes are implemented across various deployment domains namely on-premise server, single board computers (SBC) or cloud services depending on factors such as power consumption, cost, accuracy and latency.

On-premise server. An on-premises data center is a group of servers that is privately owned and is connected over an intranet system. On-premise solutions can have a lower Total Cost of Ownership (TCO) than a cloud system since it's a single time investment. The data, hardware and software platforms are completely under the control of the client. They can decide on the configurations, the upgrades and system changes. Since there is no dependence on the internet, downtime issues can be eliminated. Generally, backend server load is handled by the CPU. As the ML (machine learning) tasks are GPU intensive, additional GPU hardware is also required. This increases the initial investment.

Single Board Computers (SBC). SBCs (single board computers) can be used with on-premise servers and with the cloud, where power consumption and size is a constraint. SBCs like the NVIDIA Jetson board have both CPU (central processing unit) and GPU (graphics processing unit) on the same die. Small size of SBC makes it easier to integrate with the camera module. Portability concerns can also be addressed by on-premise SBCs. Constructed from millions of transistors, the CPU can have multiple processing cores and is commonly referred to as the brain of the computer. It is essential to all modern computing systems as it executes the commands and processes needed for your computer and operating system. The CPU is also important in determining how fast programs can run, from surfing the web to building spreadsheets. A GPU is a processor that is made up of many smaller and more specialized cores. By working together, the cores deliver massive performance when a processing task can be divided up and processed across many cores. CPUs and GPUs have different architectures and are built for different purposes.

Cloud services. Since the ML algorithms require high computational capability to run, our invention uses cloud computing with GPU acceleration. Such GPU acceleration incurs a larger cost across service providers such as AWS, GCP, Azure etc.

Data transfer. The bandwidth of the cameras are dependent on several factors such as resolution, FPS, Compression codec and quantity of the cameras. The cameras selected are of very high resolution, typically 4K. The FPS and compression codec depends upon the camera manufacturer. Generally, HEVC (H.265) is preferred because of its low bandwidth requirement. The invention may also use integrate 360° cameras with live streaming into our system.

User Interface. The invention encompasses both mobile and desktop applications for visualization of the virtual game. In this application interface the user will have provisions to initiate a new game, add players, view leaderboard, track game progress, view simulated playfield, set milestones and see achievements. Additionally, we have multiple on-premise kiosks where the users can access the above-mentioned information.

ML Pre-Deployment Elements

The pre-deployment particulars of the system refers to the tasks involved in the development of the system before it is deployed as a product. The major pre-deployment tasks of the ML component of the system are specified below:

Data collection and ML training. Highly accurate detection and tracking of golf balls from the video feed is necessary for an error-free scoring during the game. This requires ML training. This work employs ML algorithms to perform ball detection and tracking tasks. The accuracy of a ML based software component depends on the quality and quantity of the dataset upon which the algorithm was trained. As such, the proposed product necessitates the collection of a reliable dataset for training the ML algorithms employed.

FIG. 5 depicts the process of building and curating the dataset that has been used for training the ML models. We have collected images of gameplay from the driving range as well as the images of golf balls and golf games from public datasets on the internet.

This collection of data is the unfiltered raw data.

The next step is to remove duplicates from the raw data using image matching algorithms. After this step, the images are filtered based on a set of pre-set guidelines.

The guidelines are to exclude irrelevant images such as blurry images, occluded images, noisy images etc. that could potentially degrade the model performance.

After the image filtering, a quality inspection was carried out to ensure that the guidelines are being adhered to.

Once the images are filtered, the next step is to annotate the images. Annotation here refers to generating the coordinates of the bounding boxes that envelop the golf balls in the collected images. It is this information which the ML models are trained to detect and track the golf balls. Some of the images from the public datasets are already annotated. For the manually collected custom dataset and the public datasets with missing annotations, the annotations were done de novo by the inventors, by hand.

Another set of guidelines were laid out for ensuring the quality of annotations. Once the annotations were completed and the dataset was built, it was split into training set, validation set and testing set for usage in training, validation and testing phases respectively. After the dataset has been built, a class imbalance check was carried out. A class imbalance occurs when the total instances of balls of one color is significantly higher/lower than the instances of another colored ball. The class imbalance may result in a poorly performing ML model after its training. To avoid this, if a class imbalance is detected, more data samples from the class that falls short is collected or the surplus data from the leading class is dropped to bring the data to a balance. In the present training case, we did not find any significant class imbalance in the data sets. The learning process in the model is an iterative process, and so we use the class imbalance check as a condition to decide when to stop this iterative process. When no class imbalance if found, the process stope and produces a result.

Model training. Machine learning algorithms are used to generate an output from a given input based on the patterns in data. These patterns in the data are learned by the algorithm based on the data it was given to it during training. Any ML algorithm requires three main components a) Data b) Model c) Objective (Error) function. The Model is a file that has variables that get adjusted over iterations of training on a given dataset. The model training is the process in which data is passed through the model over several iterations till the model is able to predict an output with minimal deviance from the expected output, or the objective function score goes below an empirical threshold on a set of data elements that it has not seen before. The ML model inference is a computationally intensive exercise and is constrained by the hardware limitations and in turn the runtime on the deployed device. As such, before fully training and deploying the model, it is ensured that the model meets the complexity and runtime constraints. Thus, the first step is to bring the model complexity to a reasonable limit so that it can smoothly be deployed on the targeted device. See FIG. 5: Dataset Curation. Once the model meets the runtime constraint, we then train the model on the training dataset that was built earlier.

Model evaluation. During deployment of the model, the model state that gives the best predictions is determined and selected to be used in the final system. However, while training the model, such a model may not necessarily give best output in the last iteration due to issues like overfitting, model collapse etc. Apart from this, ML models have various hyper-parameters such as number of iterations, the number of images in a batch of training etc that are set empirically. A hyperparameter is a parameter that is set before the learning process begins. These parameters are tunable and can directly affect how well a model trains. Some examples of hyperparameters in machine learning: Learning Rate, Number of Epochs, Momentum, Regularization constant, Number of branches in a decision tree and Number of clusters in a clustering algorithm (like k-means). A single set of hyper-parameters may not give the best model and tuning across different hyper-parameter values may be required. In order to address these requirements and to extract the best model out of the training, various metrics are used to evaluate the prediction quality of a model. The model training is done in several iterations over the dataset until the model converges to its optimal state. After each training iteration, the model is evaluated on the validation dataset. During the model evaluation (or validation), we feed the model with a new set of data that it has not seen during the training. The outputs of the model are then compared with the expected outputs to obtain metrics like mean average precision (mAP). By tracking these metrics over the course of model training epochs, we can determine whether the model is approaching its optimal state or if it is performing poorly.

Figure 2:
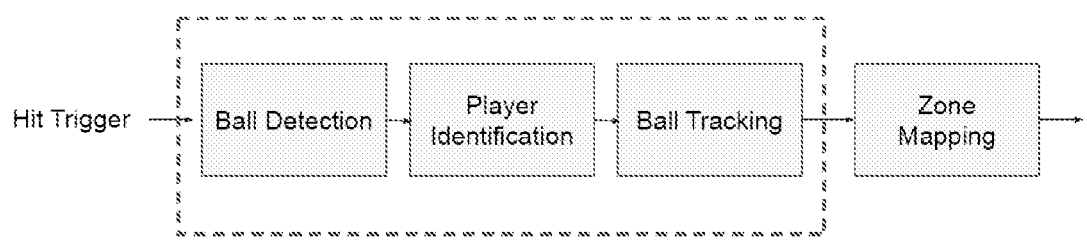
FIG. 2 Flow diagram showing sequence of events from hit trigger to zone mapping.

The metrics that are used for these models vary from task to task. The proposed work mainly includes two task object detection and classification. If you have to define the class of an image, it relates to the object classification task. If you have to define coordinates of an object on the image, then it is the object detection task. The standard evaluation metrics used for object detection includes Intersection Over Union (IoU) and mean average precision (mAP), and for classification its precision, recall and area under the Curve (AUC). The IoU (Intersection Over Union) metric in object detection evaluates the degree of overlap between the ground truth (gt) and prediction (pd). The ground-truth and the prediction can be of any shape (rectangular box, circle, or even irregular shape) in our case it's a rectangular box. FIG. 2 shows how IoU is calculated. See FIG. 6: IoU score calculation, it's the ratio of area overlap to the area of union.

IoU (Intersection Over Union) ranges between 0 and 1 where 0 shows no overlap and 1 means perfect overlap. IoU is useful through thresholding, that is, we need a threshold ($\alpha$, say) and using this threshold we can decide if a detection is correct or not. For IoU threshold at $\alpha$, True Positive (TP) is a detection for which IoU (gt,pd)$\geq\alpha$ and False Positive (FP) is a detection for which IoU (gt,pd)<$\alpha$. A false negative is a ground-truth missed together with gt for which IoU(gt, pd)<$\alpha$.

Precision (Pr) is the ability of a model to identify only relevant objects and is calculated as the percentage of correct positive predictions. Recall (Rc) is the ability of a model to find all relevant cases (all ground-truth bounding boxes). It is the percentage of correct positive predictions among all given ground truths.

$$P = \frac{TP}{TP+FP} R = \frac{TP}{TP+FN}$$

Average precision(AP)@$\alpha$ is Area Under the Precision-Recall Curve(AUC-PR) evaluated at $\alpha$ IoU threshold. Mean average precision (mAP) is the average of AP values over all classes(objects that are to be detected).

Model Optimization (a) Model Pruning and Quantization

Pruning and Quantization are techniques to compress model size for deployment, allowing inference speed up and energy saving without significant accuracy losses.

Pruning is a technique which focuses on eliminating some of the model weights (trainable variables) to reduce the model size and decrease inference requirements. Pruning has been shown to achieve significant efficiency improvements while minimizing the drop in model performance (prediction quality). Model pruning is recommended for cloud endpoints, deploying models on edge devices, or mobile inference (among others).

Model quantization is another performance optimization technique that allows speeding up inference and decreasing memory requirements by performing computations and storing tensors at lower bit widths (such as INT8 or FLOAT16) than floating-point precision. This is particularly beneficial during model deployment.

Quantization Aware Training (QAT) mimics the effects of quantization during training: The computations are carried-out in floating-point precision but the subsequent quantization effect is taken into account. The weights and activations are quantized into lower precision only for inference, when training is completed.

Quantization is useful when it is required to serve large models on machines with limited memory, or when there's a need to switch between models and reducing the I/O time is important.

Tensor RT and TensorFlow Lite (TF-Lite)

Tensor RT and TF-Lite are SDKs provided by NVIDIA and Tensorflow to improve the deep learning inference speed. TensorRT is highly optimized to run on NVIDIA GPUs and TF-Lite is a framework that provides a set of tools that enables on-device machine learning on mobile, embedded, and edge devices. TF-Lite and Tensorrt both support optimisation techniques like pruning and quantization. The proposed work converts the trained object detection and classification models into tensorrt for deploying it on premise with NVIDIA Jetson Board and is converted to TF-Lite to run inference on mobile devices.

Software Components

The workflow of the proposed software is depicted in FIG. 9.

Input Feed. The first step is to capture the live feed of the playground (the topography being visualized) using the deployed camera system. Two types of camera system are employed—a single 360-degree action camera or an IP camera array. In case of an action camera, the camera can be mounted on top of a pole that is close to the flag point. Since it is a 360-degree camera, we can obtain a complete view of the playfield by employing a single camera. In the case of an IP camera system, we cannot capture the visual of the complete playground with a single camera due to its lower field of view. Thus, for an IP camera-based system, multiple cameras are to be mounted on a pole to view the whole playfield.

RTMP Server. If the camera deployed for the product is an action camera, an RTMP server is necessary to stream the captured visuals directly to the computing device. In case of an IP camera system, the visuals can directly be streamed to the computing device using the internet protocol.

Video Decoder. Both the action camera and the IP camera array systems stream the visuals to the computing device in an encoded format. The encoding is usually done to compress the raw video and audio data so that they can be sent over the network connection at a much lower bandwidth than otherwise. Thus, at the receiving end of the communication channel, the encoded video signals are decoded and uncompressed to restore the original visual information.

Adaptive Frame Skip. Although the ML models deployed are lightweight and require low computing, the performance of the system is dependent on the computing hardware. The hardware constraints can prevent the system from operating real-time. Real-time here implies that the system is able to process the video frames at a rate higher than the rate at which the visuals are being streamed by the camera. We have an adaptive frame skip mechanism that drops certain frames from the video feed if the system is unable to process the frames at real-time due to hardware limitations. The frame dropping has negligible effect on the system performance if the system can in effect achieve an FPS of 5.

Image unfolding. If the camera system deployed employs an action camera, an image unfolding algorithm is used to dewarp the 360-degree video feed. The dewarping is necessary to run ball detection and tracking that is applied later on.

Image fusion. If the camera system employed is an IP camera array, an image fusion algorithm is employed to merge the visuals of multiple cameras into a single video frame. The image fusion algorithm would enable the seamless visualization and ball tracking, as the balls transit across the field of view of different cameras.

ROI (region of interest) Extraction. Once the complete view of the playfield is obtained, the next step is to eliminate the unwanted region in the video frame. Since the only regions we are interested in are the scorable zones, the other regions can be cropped out from the frame. The elimination of irrelevant regions would reduce the overall image size and hence could be processed faster by the ML models.

Image Restoration

In some situations, extracted images are corrupted due to the various weather conditions such as sunny, rainy, cloudy etc. This may result in under-exposure or overexposed video frames. In order to address such issues an adaptive contrast enhancement technique, where the system checks for the exposure level in an image and based on the output it equalizes the image exposure to required value.

Ball Detection

The ball detection refers to the identification of each unique ball from the camera visual. The system intends to simulate the outcome of human intelligence, in identifying each unique ball in the playfield and assign its corresponding score. As such, a computer assisted system is necessary to identify each ball across multiple frames of the video.

In a preferred embodiment, we employ an object detection algorithm to detect the balls from the video. Additionally, an object tracking algorithm will be employed to identify the unique balls as they transit across the frames. The object detection algorithm in general predicts the position and type of the objects of interest in an image. In our scenario, the objects of interest are the golf balls. Once the user hits the ball from the driving range, a 'hit trigger' is initiated in the system. The ball may appear at some point in the field of view of the camera system after a hit trigger has been initiated. The ML algorithm that performs the object detection is deployed in one of the computing devices in the system. This device continually monitors the camera visuals and runs the ML object detection algorithm on the video frames. The phenomenon of taking outputs from a trained ML model is called model inference. The inference outputs of an object detection algorithm are the bounding box coordinates and the class number (class id) of the detected objects. A bounding box is the rectangular box with the minimum area that envelopes an object of interest. The class id is a unique identifier that denotes the class of an object. The players may be assigned with the balls of a specific color that is unique to them, so that the object detection model can directly map each ball to its corresponding player.

Note that ball detection and ball tracking are different. Ball detection—In each image there will be many items, a golf ball, human, leaves etc so we use our ball detection algorithm to identify if there is a ball present if yes where exactly is it. Ball Tracking—This is used when the ball is moving, the position of the ball will change in each frame of image from the video, we use ball tracking algorithm to keep track of the position of the ball in the image from frame to frame. These two are two different algorithms and the purpose of each one is also different.

Ball Color Estimation and Player Identification. Once the ball coordinates are obtained, the next task is to identify the corresponding player. Since each user is assigned to a unique color, players can be identified based on the color of the ball. For this task, crops of the frame are taken corresponding to the bounding boxes where the golf balls have been identified. These crops are then fed to a ML-based color classification algorithm which predicts ball color. Based on the obtained results the balls are assigned to the corresponding player and then used for shot identification.

Ball Tracking and False Suppression. At any given moment during the gameplay, there can be multiple balls already occupying the playfield, each of which corresponds to its respective player. When the count of balls of a given color is more than one, it implies that the player has already made two or more shots. At this point, the ball identification and classification algorithm can give us the information on the number of balls played that corresponds to each user. However, it is difficult if not impossible to find which ball corresponds to a given shot from the ball detection information alone. To solve this challenge, we employ a ball tracking algorithm that continuously monitors the coordinates of the balls and predicts the order in which they appeared during the gameplay. Leveraging this, we can display the score obtained for a specific shot at any point later on. For fast and accurate ball tracking, we employ a lightweight deep learning-based algorithm called DeepSort. Also, by employing tracking we identify the detected objects that have a history of motion during the gameplay. If somehow a stationary object in the playfield was falsely detected as a ball by the system, it can be dismissed as a false detection since it lacks a motion history. This will suppress the false detections contributed by objects like dry leaves, dirt, litter etc. that may mimic the appearance of an actual golf ball from the camera perspective. See FIG. 7: Steps involved in ML pipeline.

Shot Mapping. From the tracking information, we can keep a history of the motion of each ball in the playfield. It can be leveraged to estimate the ball's deceleration, velocity, direction, its current position etc. Also from the color classifier output, we have mapped each of the balls in the playfield to its corresponding player. By processing these two bits of information, we can map each shot to its corresponding player in the chronological order within the game. This information is further used for the scoring of each shot.

Zone Mapping. The playfield itself is virtually segmented into different sections or zones by a set of concentric rings. The center of the circles denote the fixed flag point to which the players direct their shots during the gameplay. The zones represent the accuracy that the player achieves in his individual shots during gameplay. As such, the zone closest to the flag point carries a high reward point and it decreases with the distance from the center. During the gameplay, it is desirable that the score achieved in each shot be calculated automatically based on its zone by employing a software system. See FIG. 3: The playfield is divided into different zones. Closer the zone to the center higher the score.

Scoring. After the zone mapping, we have the information on the final resting zone of the ball for each shot. Also, the player who made the shot has already been identified at this point. The next step is to assign the score to the corresponding player who made the shot. We have a rule-based system which assigns the score based on a lookup table that maps the zone to its corresponding score. See FIG. 8: The flow diagram of the golf gamification system.

Embodiments and Examples

The invention may be embodied in several ways. In this disclosure we have chosen to discuss a preferred commercial embodiment directed at a golf-derived game using ball tracking and scoring in a virtual environment that can be live-linked to other players over intranet or internet. The system uses cameras feeding information to one or more computers and the tracking process is performed using an ML/AI algorithm using model inference, and a backbone algorithm.

In more detail, the general method of employing the invention is as follows.
Assignment of Resources
  Each player is assigned a set of resources including:
   a driving range/golf course platform;
   a unique colored golf ball; and
   a shared digital kiosk.
Device Pairing
  The mobile device of each player is paired with the kiosk for the particular color of ball. The player can view the game statistics on the paired device. A game leaderboard and a global leaderboard can be displayed along with score history and shot history. Shots can be stored and shot replay can be viewed. The players can form a team and compete against each other or play individually.
Hit Detection
  Hit detection may or may not be used in the system of the invention. Some embodiments use hit detection, others may use only detection in a landing zone. Hit detection may employ a combination of a specific pattern or motion/sound which can be trained into the ML system, and can be further optimized by listening for an audio signature of a 'hit'.
Ball Tracking
  The ball tracking is performed using an ML/AI algorithm using model inference, and a backbone algorithm. The system may be activated upon receiving a hit trigger from hit detection engine. For ball tracking, we may employ a lightweight deep learning-based algorithm called DeepSort. The tracking system is composed of a camera in functional communication with a machine-learning (ML) Engine or an IoT-ML engine. This is to say that a camera is provided which is in functional communication with a microcomputer/CPU programmed to run an ML algorithm. The connection may be physical (optical/electrical conductors etc.) or may be wireless, e.g., via the cloud or a local Wi-Fi signal. The microcomputer is connected to the internet. The video processing is usually done locally avoiding sending large video content to a cloud-based processor. Once the system detects that a player has hit the ball, it initiates a hit trigger, flagging and noting that a particular event happened in the software. If the hit trigger flag is set, then the algorithm expects the presence of a new ball in one of the future frames of the video feed so that it can start tracking the ball from that point onward. This specific ball can be tracked individually from other balls from the same player.

Note that the IoT-ML Engine performs three functional duties: (i) Each camera feed is monitored by the on-premises IoT device that detects and localizes the golf ball within the angular section it covers; the IoT device is often connected physically to the camera (ii) The backbone algorithm maps each ball in the arc section to the corresponding player. (iii) Each new ball in the playfield is tracked by backbone algorithm to identify its final zone/score.

The whole detection and tracking process is performed using an ML/AI algorithm and a backbone algorithm. The backbone algorithm has multiple objectives such as reading video frames from the camera stream, feeding it to the AI algorithm and post-processing its outputs, fusing the feeds of the camera array into a single 2D view of the playfield, zone mapping, syncing the data with the kiosk etc. The AI algorithm performs only two specific objectives: (i) Ball detection (the algorithm receives an image frame as input and gives the ball coordinates as output) and (ii) Ball tracking.
Ball Detection
  Once a hit trigger is initiated, the ball may appear at point in the field of view of the camera array system. To detect the ball, a state-of-the-art AI based object detection algorithm is employed. This algorithm predicts the coordinates of the ball within the field of view. For near-realtime inference, a lightweight object detection algorithm is used that it is well suited for IoT platforms. The model is trained on a custom dataset that mimics the production environment so that the coordinate prediction error is minimal. Single Stage Ball Detection may be performed by: N×N grid on image, bounding box and confidence prediction Class probability map. The ball detection system and AI based object detection algorithm may include a color and/or size discrimination algorithm. This ensures that the object tracked is limited to objects with the properties of balls, and prevents tracking for example a person in a blue shirt instead of a blue ball, or identifying green grass as a green ball. The system uses AI and ML to identify appropriate targets and remove nonconforming targets.

The object (the ball) is identified by size and color. An object may be analyzed for color content, and the results are stored on a system database located on the device or on a remote server. The color analysis of the objects may comprise advanced image processing techniques, such as Main Color extraction using color space transformation comprising HSV, RGB and CYMK to map between pixels in the image. The user can subsequently view a display on their mobile identifying the visual object's Main Colors and at least one Harmonic Color; and then select and view all items (i.e. products in a database) comprising one Harmonic Color, and/or all items of a specific type and Harmonic Color. The prior art discloses a number of color matching applications. In most cases the user captures and stores an image of the item with their mobile device camera or laptop webcam. For example, United States Patent Application 20090252371 breaks down the component colors into percentages (i.e. "Red: 10%, Blue 47%, Green 43% and Purchase Item Image: Red: 12%, Blue 47%, Green 41%"). It will then display a closeness of color match based upon a preset overall percentage margins.

Other optional methods of object detection and tracking include object tracking in accordance with the object shape in digital video systems having at least one camera for recording and transmitting video sequences. This may use an object detection algorithm based on a Gaussian mixture model and expanded object tracking based on Mean-Shift are combined with each other in object detection. The object detection may be expanded in accordance with a model of the background by improved removal of shadows, the binary mask generated in this way is used to create an asymmetric filter core, and then the actual algorithm for the shape-adaptive object tracking, expanded by a segmentation step for adapting the shape, is initialized, and therefore a determination at least of the object shape or object contour or the orientation of the object in space is made possible.

Zone Mapping

Zone mapping is used to superimpose zones upon a 2-D field (the "playfield"). With the target point at its center, the playfield is virtually divided into concentric zones. Based on the final position of the ball, its zone is identified and scoring of the final resting place of balls based on color tracking on golf balls within particular target zones established digitally by a camera.

The prediction of outputs by the AI/ML algorithm for a given input is termed as inference. In the present invention, the process of predicting the ball coordinates from a given video frame will be the 'inference' and the time required by the algorithm to make this prediction will be the inference time. Since there is a delay incurred due to inference time, the system may not be able to operate at the same rate as the video fps. If the inference time is negligible, the algorithm that can deliver outputs at the frame rate of the video feed itself and can be considered to be 'realtime'. There is a tradeoff between inference speed and detection accuracy as the AI algorithms that have high detection accuracy tend to have high inference time and vice versa.

The invention uses AI to detect the coordinates of the golf ball. First we teach the AI algorithm how to detect the ball. This is called the training phase of the model. In the training phase, we collect images of the driving range while the game is being played. Next the coordinates of the golf balls are labeled with an annotation software. The set of such image-coordinate pairs collected is called the 'dataset' in machine learning terminology. The AI algorithm is trained on this dataset so that the model can learn how to generate the coordinates of the ball if an image is given to it as the input. The 'production environment' here refers to the physical environment on which the AI algorithm performs its inference. In our scenario, it refers to the images of the driving range itself. The model is trained on a custom dataset that mimics the 'production' environment. This is a very important factor from a deployment perspective as we can train the AI model on a dataset of soccer images or tennis images for ball detection, and use it for inference on golf balls. It works well because the golf balls have many similarities with the aforementioned balls used in sports. But, for best detection accuracy, the images in the training dataset should match with that of the images used for inference. Because there is no public dataset for golf ball detection, the applicant has collected the images from the driving range and labeled them to produce our custom dataset. The system makes a prediction of the ultimate location of the ball.

The output of an AI-based object detection has 3 main components—the bounding box, the class id, and the confidence score. 'Bounding box' is essentially the coordinates of the rectangle that inscribes an object of interest in an image. The class id specifies what kind of object is inscribed in that bounding box. For multi-class detection, like 'car', 'human', 'clock', 'ball' etc, each class is assigned an id like—0, 1, 2, 3 etc. Corresponding to each bounding box, the AI model also predicts the class id which indicates object type. In actual implementation, the model predicts a class probability map indicating the probability that the detected object belongs to each of these classes. The class that gets the highest probability is chosen as the detected class. Corresponding to each bounding box, the AI model also predicts a confidence score for that bounding box. The confidence score is a value ranging from 0 to 1, indicating how confident the model is that the predicted bounding box is correct. A score of 1 implies that the model strongly suggests that the bounding box exists at the predicted coordinates and as it reaches 0, the model suggests that the bounding box, although predicted, is actually a false positive.

Games and methods of the invention There are many methods by which the invention may be practiced by one or more players. In a simple embodiment a player will receive a bucket of one colored balls. The number of balls will be determined by the length of the game they are playing (Example: 27 balls for a 9-hole game, 54 for 18 holes game). There will be a specific color of ball for the total number of bays on the driving range to allow maximum capacity. No one color of ball can be used by more than one player on the range at the same time. It may be decided to assign the blue balls exclusively to bay one, red balls to bay two, and so on.

Player One will open his/her App and indicate that he/she is starting the game. Player One with the blue balls will scan the ball through his App or just type in Blue in the designated screen in the App on their smart phone.

The App will then communicate with the Camera Device which will then look for and track Player One's blue balls until Player One has completed their game. When Player One has completed their game, they will let the App know by indicating so on their screen. The Camera Device may also be notified when to turn off by the number of balls hit, say 27 balls for a 9-hole game or by 27 minutes allotted for the player for a game. No more blue balls can be on the range when Player One is playing their game.

During Player One's game his ball location is communicated to the App in real time and score is tracked on the electronic score card in the App. This score can be viewed by the Player One in real time on the smart phone.

If Player One is competing with another player or in a group of players each score of the players in the group will be visible on each player's respective screen. Once the players' scores have been recorded and finalized, this information will be used to establish leader boards, leagues, etc. Linked/networked play will promote a following and a community which should allow the App to be monetized for commercial and charitable purposes. We envision a subscription support base, advertising to follow when appropriate, and potentially a prize-based system.

Example #1

Single Camera Ball-Tracking System.

A camera system is provided. The camera fulfills three main functions. (1) It "projects" a virtual map onto the 2-dimensional surface ("a topography") in the camera's field of vision. (2) It tracks a ball on the basis of its color. (3) It captures an image of a ball based on color. The camera is placed on a mount e.g., 10, 12, 15, 17 or 20 feet above the play zone looking approximately downward onto the ground. The camera identifies a target zone within its field of view encompassing multiple different potential scoring regions, each with its own score.

A virtual map is projected and overlaid onto a two-dimensional topographical space. Zones are defined within the map. The zones may be normalized to provide equal surface areas. The camera system comprises an optical image capture system and a CPU in communication with a memory, wherein the CPU runs software to track and identify a ball by color. When a ball is detected within a zone, it is allocated a score associated with that zone. The software works with a transmitter/receiver system to send the score and location information to one or more second computers in one or more remote devices running an application that can store, analyze and display the score and location information. The remote computers may include hand-held devices such as phones and may also include a stand-alone kiosk with an interface that can be accessed by multiple players. Colored balls, each specifically assigned to a player are hit from a distance towards the established zones within the camera's field of view. Once the ball finally rests in a zone, the camera software registers the ball's location and assigns a corresponding score to the specific player. The camera is functionally linked to a microprocessor, and a memory programmed with a code executing commands through a CPU. The memory may be a flash memory or static RAM chip, or could be a magnetic or optical memory. The system components generally may include and be in communication with "internet of things" (IoT) components and a may include a machine learning (ML) engine for constant performance improvement and system enhancement.

The system performs the following steps:

(a) Resources are assigned including a driving range platform, a unique colored golf ball and a shared digital kiosk (b) A device is paired via the kiosk to the camera/ball tracking system.

(c) Hit detection is enabled (d) A camera is activated for ball tracking (e) The status is updated on the kiosk and the paired device (f) The ball is tracked. The ball tracking system is activated upon receiving a hit trigger from hit detection engine. The tracking system is composed of a Camera and IoT-ML Engine. Once the system detects that a player has hit the ball, it initiates a hit trigger (flagging that a particular event happened in the software). If the hit trigger flag is set, then the algorithm expects the presence of a new ball in one of the future frames of the video feed so that it can start tracking the ball from that point onward.

(g) A score is allocated, parsed, compiled and displayed on the paired device.

(h) The camera tracking and zone identification are both performed within the camera hardware. Device paring, hit detection, ball tracking, zone identification and score all feed into the paired device which constantly updates and displays the score and/or location for each ball for each color/player. A game leaderboard and a global leaderboard can be displayed along with score history.

The whole detection and tracking process is constituted of an ML algorithm and a backbone algorithm. The backbone algorithm has multiple objectives like reading video frames from the camera stream, feeding it to the AI algorithm and post-processing its outputs, fusing the feeds of the camera array into a single 2D view of the playfield, zone mapping, syncing the data with the kiosk etc. The AI algorithm performs only two specific objectives: (i) Ball detection (The algorithm receives an image frame as input and gives the ball coordinates as output) and (ii) Ball tracking.

Example #2

Other embodiments of the invention include applying the tracking system to different applications such as: Outdoor rifle ranges, archery ranges, basketball, football, darts and bowling.

Example #3

Multiple Cameras

The method generally discussed in this disclosure uses one camera and with a 180 degree view, but other versions may have a 360 degree view which may require 2 or 3 cameras or more.

Example #4

Ultraviolet or infrared markers may be used on the objects to be tracked (the balls).

Example #5

Animation of the balls may be provided using unloadable, programmable or integrated software. Animation may be provided in the app or on the shared digital kiosk. For example, flags, expressions, sounds, fireworks, explosions etc. may all be employed to make the game experience more exciting.

Example #6

Professional tournament series and ultimately an online gambling or betting component. Additionally, online direct or indirect sales could be added when demand is created. An associated invention is a ball dispenser that can sort and dispense the colored balls mechanically. Once the balls are sorted and back in the machine, they will be ready to be dispensed for the next player's game. The dispensing machine will be equipped with software that communicates with the App to ensure the same color balls are not being played at the same time on the range. Finally, we would like to have a color scanning mechanism that could scan the balls and assign to the designated player as the balls are dumped into the individual's players basket. This will eliminate the need for the player to self-scan before every shot if that may prove necessary in the early development stages of our game and App.

Example #7

Negative limitations. In some embodiments there will be specific negative limitations, such as, for example, the system will specifically NOT comprise and will exclude GPS tracking, RFID tracking, radar tracking, and any form of microchip or electronics within the ball. The current embodiments allow the game to be played with the current tracking system with regular clubs and regular balls, with the only limitation being that the balls are marked in some way such as by color, infrared or ultraviolet or fluorescent markers that can be tracked by using an optical tracking device alone.

Example #8

The system may be activated upon receiving a hit trigger from hit detection engine. The tracking system is composed of a camera in functional communication with a machine-learning (ML) Engine or an IoT-ML engine programmed into a microcomputer. The ball tracking is performed using an ML/AI algorithm using model inference, and a backbone algorithm using a lightweight deep learning-based algorithm. The microcomputer is connected to the internet. Video processing is usually done locally avoiding sending large video content to a cloud-based processor. The system detects that a player has hit the ball, and initiates a hit trigger, flagging and noting that a particular event happened in the software. The backbone algorithm maps each ball in in the topography to a corresponding player. Each new ball in the playfield is tracked by backbone algorithm to identify its final zone/score. The backbone algorithm reads video frames from the camera stream, feeds data to the AI algorithm and post-processes these outputs, fusing the feeds of the camera array into a single 2D view of the playfield; the backbone algorithm also performs zone mapping and syncing the data with the kiosk/remote displays. The AI algorithm performs only two specific objectives: (i) Ball detection (the algorithm receives an image frame as input and gives the ball coordinates as output) and (ii) Ball tracking. Ball Detection may be performed using an N×N grid on image, bounding box and confidence prediction class probability map. AI based object detection algorithm may include a color and/or size discrimination algorithm. Scoring is done by zones. Zone mapping is used to superimpose zones upon a 2-D field on a real topography—the "playfield". The playfield is virtually divided into concentric zones. Based on the final position of the ball in a zone, a score is produced, stored and displayed on one or more displays.

GENERAL DISCLOSURES

The below may be of particular interest. Publications to be incorporated by reference include U.S. Pat. No. 9,336,453B2 Image capture and identification system and process; U.S. Pat. No. 8,948,450B2 Method and system for automatic object detection and subsequent object tracking in accordance with the object shape; Also of interest is EP2798394B1 System for tracking a golf ball and displaying an enhanced image of the golf ball; and AU2018404876B2 Golf ball tracking system in which sensors are positioned to detect a plurality of observed ball flight paths.
US 20210113892 Bluetooth Enabled Ball Analyzer and Locator
US 20060166737 Method and system for athletic motion analysis and instruction
US 20020091011 Impact and roll measurement device
US 20180318644 System and Method for Three-Dimensional Object Tracking Using Combination of Radar and Image Data
US 20190311543 Mixed Reality Golf Simulation and Training System
US 0200330830 Golf Ball Tracking System
US 20200306595 Bluetooth Enabled Ball Analyzer and Locator
US 20200269121 System and methods for golf ball location monitoring
US 20200182999 Golf Ball Tracking System
US 20200139193 System and method for 3d optical tracking of multiple in-flight balls
US 20200004322 Mixed-reality golf tracking and simulation
US 20190255407 Golf simulating system and method for playing a golf game
US 20180261010 Mixed reality golf simulation and training system
US 20190022460 Golf shot tracking system.

This specification incorporates by reference all documents referred to herein and all documents filed concurrently with this specification or filed previously in connection with this application, including but not limited to such documents which are open to public inspection with this specification. All numerical quantities mentioned herein include quantities that may be plus or minus 20% of the stated amount in every case, including where percentages are mentioned. As used in this specification, the singular forms "a, an", and "the" include plural reference unless the context clearly dictates otherwise. Thus, for example, a reference to "a part" includes a plurality of such parts, and so forth. The term "comprises" and grammatical equivalents thereof are used in this specification to mean that, in addition to the features specifically identified, other features are optionally present. For example, a composition "comprising" (or "which comprises") ingredients A, B and C can contain only ingredients A, B and C, or can contain not only ingredients A, B and C but also one or more other ingredients. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example, "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

Where reference is made in this specification to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). When, in this specification, a range is given as "(a first number) to (a second number)" or "(a first number)–(a second number)", this means a range whose lower limit is the first number and whose upper limit is the second number. For example, "from 40 to 70 microns" or "40-70 microns" means a range whose lower limit is 40 microns, and whose upper limit is 70 microns.

TERMINOLOGY AND DEFINITIONS

Ball location. Assuming the video frame is of height 'H' pixels and width 'W' pixels, the location of a ball implies the coordinates of the ball's center along the horizontal and vertical axes in terms of pixels in a given video frame.

Ball detection. The ball detection refers to the identification of each unique ball from the camera visual. The term 'identification' implies finding the ball's location in a given video frame.

Ball tracking. The system processes live video feed in a frame by frame manner and location of the balls and number of balls in each frame changes over time. Tracking is the technique used to identify the same ball across consecutive frames.

Scoring. Scoring refers to assigning a score to a given shot based on the final location of the ball after it has been shot from the driving range. The final location of a ball implies the ball's location when its motion ceases completely after being shot. The scoring depends on the zone within which the ball has finally been settled.

Zone. The playground is virtually divided into different zones based on the distance from the flag post. The zones are concentric rings with the flag post as their center. Different balls in the same zone carry equal scores while the balls in different zones carry a different score.

Hit detection. Hit detection is a trigger given to the software system when the golf club comes in contact with the ball. It signifies that the player has attempted a shot from the driving range.

Model. Model implies the artificial intelligence algorithm that has been employed to perform a given task. Here we have different models for different tasks like ball detection, ball tracking etc.

Model training. Machine learning algorithms are used to generate an output from a given input based on the patterns in data. These patterns in the data are learned by the algorithm during the process called model training. In the model training, we supply the model with the inputs and the expected outputs. In ball detection, the input is the video frame and the outputs are the bounding boxes. During the model training, the model progressively undergoes some changes in its parameters which ultimately makes it capable of predicting the bounding boxes of an object with reliable accuracy.

"Inference" refers to the prediction of outputs by the AI/ML algorithm for a given input.

"Model" here refers generally to an AI algorithm.

"Play zone" is the area over which the game is played.

"On Premise" as used herein means "attached" in such a way to convey that the device is connected and physically in proximity to the camera.

"Production environment" refers to the physical environment on which the AI algorithm performs its inference. E.g., in this scenario it refers to the images of the driving range itself. The model is trained on a custom dataset that mimics the production environment. This is very important as the system can train the AI model on a dataset of soccer images or tennis images for ball detection, and use it for inference on golf balls.

"Bounding Box" and "Confidence prediction" refers to a system in which the 'Bounding box' is essentially defined by the coordinates of the rectangle that inscribes an object of interest in an image. The class id specifies what kind of object is inscribed in that bounding box. For multi-class detection, like 'car', 'human', 'clock', 'ball' etc, each class is assigned an ID such as 0, 1, 2, 3 etc. Corresponding to each bounding box, the AI model also predicts the class id which indicates object type. In actual implementation, the model predicts a class probability map indicating the probability that the detected object belongs to each of these classes. The class that gets the highest probability is chosen as the detected class. Corresponding to each bounding box, the AI model also predicts a confidence score for that bounding box. The confidence score is a value ranging from 0 to 1, indicating how confident the model is that the predicted bounding box is True. A score of 1 implies that the model strongly suggests that the bounding box is existing at the predicted coordinates and as it reaches 0, the model suggests that the bounding box, although predicted, is actually a false positive.

"Zone Mapping" refers to the dividing of an area into virtual zones.

"DL" Deep learning

"AI" refers to artificial intelligence. May be used interchangeably with ML.

"ML" refers to machine learning. May be used interchangeably with AI.

Other systems, methods, features and advantages of the invention will be, or will become, apparent to one of ordinary skill in the art upon examination of the following figures and detailed description.

The invention claimed is:

1. A system for projecting a virtual map upon a two-dimensional surface and locating and/or tracking a colored target object within that map and ascribing a score to said target object based on color and location within said virtual map, the system comprising: one or more colored target objects which objects contain no electronics and no power source, and a digital camera feeding data to a computer comprising a CPU and a plurality of integrated circuits, which computer is functionally in communication with programmable medium, wherein the camera captures a digital image and the computer executes a software-encoded program to identify a desired target object by color and size within the map, wherein the map comprises a plurality of zones, wherein each zone is associated with a specific score, and each stationary target object identified within a zone is ascribed a score associated with the zone, and wherein the computer captures and compiles data related to the score and presents the data graphically in real time on a graphical user interface (GUI) in functional communication with the computer, wherein the computer is programmed and adapted to run a ML engine and a backbone algorithm, wherein the ML engine monitors the camera data feed using an on-premises device that detects and localizes the golf ball, and maps the ball location and tracks the ball to identify its final zone/score.

2. The system of claim 1 wherein the target object is a ball with a diameter of between 4 cm and 12 cm.

3. The system of claim 2 wherein when the ball is ascribed a score only when it has come to rest and is stationary and is located within a specific zone of the map.

4. The system of claim 3 wherein the computer communicates with a transmitter system to send the score and location information to one or more second computers in one or more remote devices running an application that can store, analyze and graphically display the score and location information.

5. The system of claim 3 wherein the computer communicates with a stand-alone kiosk with an interface that can be accessed by multiple players.

6. The system of claim 3 wherein the computer communicates with one or more hand-held devices that can be accessed by multiple players.

7. The system of claim 3 wherein different colored balls are specifically assigned to different players.

8. The system of claim 3 wherein the computer is in physical contact via electrical or optical conductors with a microcomputer that processes video information, identifies and scores the ball.

9. The system of claim 3 wherein the memory selected from the group consisting of a flash memory or static RAM chip, a magnetic or an optical memory.

10. The system of claim 3 further comprising networked components including IoT components.

11. The system of claim 3 further comprising a machine learning (ML) engine.

12. The system of claim 3 wherein the system utilizes a logic flow that performs at least the following service flow steps:
   (a) assign resources
   (b) device pairing
   (c) hit detection
   (d) camera (single or multiple) ball tracking
   (e) status update on paired device
   (f) zone identification
   (g) compute score.

13. The system of claim 12 wherein each player is assigned a set of resources including: a driving range platform, a unique colored golf ball and a shared digital kiosk.

14. The system of claim 12 wherein a mobile device is associated with each player and is paired with the kiosk for the particular color of ball.

15. A method for playing a game by one or more players involving scoring an object by
   (a) providing a system for projecting a virtual map upon a two-dimensional surface and locating and/or tracking a colored target object within that map and ascribing a score to said target object based on color and location within said virtual map, the system comprising: (i) one or more colored target objects which objects contain no electronics; (ii) a digital camera feeding data to a computer comprising a CPU and a plurality of integrated circuits, which computer is functionally in communication with programmable medium, wherein the camera captures a digital image and the computer executes a software-encoded program to identify a desired target object by color and size within the map, wherein the map comprises a plurality of zones, wherein each zone is associated with a specific score, and each stationary target object identified within a zone is ascribed a score associated with the zone, and wherein the computer captures and compiles data related to the score and presents the data graphically in real time on a graphical user interface (GUI) in functional communication with the computer;
   wherein the computer communicates with a stand-alone kiosk having an interface that can be accessed by one or more players; and wherein the computer additionally communicates with one or more hand-held devices that can be accessed by one or more players
   (b) pairing said one or more hand-held devices via said kiosk to the camera/ball tracking system;
   (c) detecting a hit to enable the tracking software to track a ball of a certain color;
   (d) activating a camera for ball tracking;
   (e) updating said data related to the score on the kiosk and the paired device;
   (f) tracking the ball and
   (g) and further updating said data related to the score on the kiosk and the one or more hand-held devices such that said one or more players may view said data related to the score on a graphical user interface of either the kiosk or the one or more hand-held devices.

16. The method of claim 15 wherein the ball tracking system comprises a camera in functional communication with a machine-learning (ML) engine programmed into a microcomputer, and wherein ball tracking is performed using model inference, and wherein the computer receives a hit trigger from a hit detection engine, wherein the computer is programmed and adapted to run a ML engine and a backbone algorithm, wherein the backbone algorithm monitors the camera data feed using an on-premises device that detects and localizes the golf ball, and the ML engine maps the ball location and tracks the ball to identify its final zone/score.

* * * * *